US010534572B2

(12) United States Patent
Takahashi (10) Patent No.: US 10,534,572 B2
(45) Date of Patent: Jan. 14, 2020

(54) CONTROL DEVICE, CONTROL METHOD, AND STORAGE MEDIUM STORING A PROGRAM

(71) Applicant: YAMAHA CORPORATION, Hamamatsu-shi (JP)

(72) Inventor: Daisuke Takahashi, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 141 days.

(21) Appl. No.: 15/718,969

(22) Filed: Sep. 28, 2017

(65) Prior Publication Data

US 2018/0095716 A1 Apr. 5, 2018

(30) Foreign Application Priority Data

Sep. 30, 2016 (JP) .................................. 2016-194330

(51) Int. Cl.
*G06F 17/00* (2019.01)
*G06F 3/16* (2006.01)
*H04H 60/04* (2008.01)

(52) U.S. Cl.
CPC ............. *G06F 3/165* (2013.01); *H04H 60/04* (2013.01)

(58) Field of Classification Search
CPC ................................ G06F 3/165; H04H 60/04
USPC ........................................................ 715/716
See application file for complete search history.

(56) References Cited

U.S. PATENT DOCUMENTS

| 4,633,067 | A  | * | 12/1986 | Payne ..................... F24C 7/083 219/483 |
| 6,515,528 | B1 | * | 2/2003  | Tohsche ........... H03K 3/356113 327/203 |
| 7,397,273 | B1 | * | 7/2008  | Ng ....................... H03K 19/173 326/38 |
| 9,583,084 | B1 | * | 2/2017  | Fagan ...................... G10G 1/02 |
| 2003/0214678 | A1 | * | 11/2003 | Shibata ................... H04L 51/30 358/405 |

(Continued)

FOREIGN PATENT DOCUMENTS

JP         4063231 B2      3/2008

OTHER PUBLICATIONS

Abraham et al., Optimal Active Control and Optimization of a Wave Energy Converter, IEEE 2012, pp. 324-332. (Year: 2012).*

(Continued)

*Primary Examiner* — Cong-Lac Huynh
(74) *Attorney, Agent, or Firm* — Rossi, Kimms & McDowell LLP (57) ABSTRACT

A control device includes a control circuit or a processor, that performs various tasks/steps, including displaying, in a GUI, an image of an operation element operable by a user to input a user instruction, and receiving a device assigned to the operation element, a parameter, including an ON or OFF state or a level of the device assigned to the operation element, and a setting value of the parameter corresponding to an operation state of the operation element. A setting command is transmitted to the device assigned to the operation element when the operation element is operated to be in a predetermined operation state. The setting command changes the setting value of the parameter from a current value to a setting value associated to the operation element.

16 Claims, 11 Drawing Sheets

(56) References Cited

U.S. PATENT DOCUMENTS

| | | | |
|---|---|---|---|
| 2006/0050582 A1* | 3/2006 | Perner | G11C 7/062 |
| | | | 365/205 |
| 2006/0198168 A1* | 9/2006 | Fujita | H02M 3/33523 |
| | | | 363/21.13 |
| 2008/0204264 A1* | 8/2008 | Sakai | B60R 22/48 |
| | | | 340/667 |
| 2009/0138110 A1* | 5/2009 | Kohyama | H04R 29/007 |
| | | | 700/94 |
| 2017/0104488 A1* | 4/2017 | Nagatomo | H03K 3/356113 |
| 2018/0032200 A1* | 2/2018 | Hong | H03K 17/962 |
| 2018/0115826 A1* | 4/2018 | Suyama | H04Q 9/00 |

OTHER PUBLICATIONS

Son et al., Dynamic Base Station Switching—ON/OFF Strategies for Green Cellular Networks, IEEE 2013, pp. 2126-2136. (Year: 2013).*

* cited by examiner

CONTROL DEVICE, CONTROL METHOD, AND STORAGE MEDIUM STORING A PROGRAM

CROSS REFERENCE TO RELATED APPLICATIONS

This nonprovisional application claims priority under 35 U.S.C. § 119(a) on Patent Application No. 2016-194330 filed in Japan on Sep. 30, 2016, the entire contents of which are hereby incorporated by reference.

BACKGROUND OF THE INVENTION

1. Field of the Invention

The present invention relates to a control device controlling another device, a method of controlling another device, or a storage medium in which a program to control another device is stored.

2. Description of the Related Art

Japanese Patent No. 4063231 discloses an audio mixer that performs signal processing of an audio signal, and a personal computer (hereinafter referred to as a PC) connected to the audio mixer. The PC disclosed in Japanese Patent No. 4063231 defines the configuration of a signal processing function of the audio mixer being another device, and functions as a control device that controls the parameter of the signal processing function.

The PC displays a plurality of operation elements on a screen using a GUI (Graphical User Interface) technique. The plurality of operation elements are respectively associated with a plurality of parameters of the signal processing function in an audio mixer. A user can control the value of a plurality of corresponding parameters by operating the plurality of operation elements using a user interface, such as a mouse.

Further, Japanese Patent No. 4063231 discloses that a link operation element displayed on the screen of the PC is used to interlock and control (link control) the plurality of parameters of the audio mixer. However, the link operation element of Japanese Patent No. 4063231 link controls parameters of a plurality of continuous values, using the operation element that controls a continuous value of a fader, a knob, or the like. The link operation element of Japanese Patent No. 4063231 is not an operation element that controls a discrete value, such as a switch, a radio button, or the like. In addition, the link operation element of Japanese Patent No. 4063231 is not able to link control the plurality of parameters. Further, the link operation element of Japanese Patent No. 4063231 is not able to link control a desired parameter including an ON or OFF state and a level. Therefore, the link operation element of Japanese Patent No. 4063231 is not able to control collectively desired parameters including an ON or OFF state and a level, with respect to any function of any device.

SUMMARY OF THE INVENTION

In view of the foregoing, the present invention is directed to a control device, a control method, and a storage medium storing a program that are capable of collectively controlling desired parameters, including an ON or OFF state and a level, with respect to any function of any device.

The control device has a control circuit, which can be processor, configured to implement instructions stored in a memory and execute a receiving task, a setting task, and a transmitting task. The receiving task display, in a user interface, an image of an operation element that is operable by a user to input a user instruction. The setting task receives a device assigned to the operation element, a parameter, including an ON or OFF state or a level of the device assigned to the operation element, and a setting value of the parameter corresponding to an operation state of the operation element. The transmitting task transmits a setting command to the device assigned to the operation element when the operation element is operated to be in a predetermined operation state. The setting command changes the setting value of the parameter from a current value to a setting value associated to the operation element.

The control method that executes method steps similar to the tasks described above.

The storage medium is non-transitory and the program is executable by a computer to execute the control method.

The above and other elements, features, characteristics, and advantages of the present invention will become more apparent from the following detailed description of the present embodiments with reference to the attached drawings.

DETAILED DESCRIPTION

A control device has a control circuit, which can be configured as a receiving portion, a setting portion, and a transmitting portion. The receiving portion displays, via a GUI, an image of an operation element and receives an operation of a user with respect to the operation element. The setting portion receives a device assigned to the operation element, a parameter, including an ON or OFF state or a level of the device assigned to the operation element, and a setting value of the parameter corresponded to an operation state of the operation element. The transmitting portion transmits a setting command to the device assigned to the operation element when the operation element is operated to be in a predetermined operation state. The setting command changes the setting value of the parameter from a current value to a setting value associated to the operation element.

Thus, the control device, when the operation element is in the predetermined operation state (from the ON state to the OFF state, for example) by the operation of a user, changes the setting value of the parameter assigned to the operation element to a setting value according to a resulting operation state (according to the OFF state, for example). Therefore, when a user operates an operation element, parameters assigned to the operation element, with respect to any function of any device, are collectively controlled.

Figure 1:
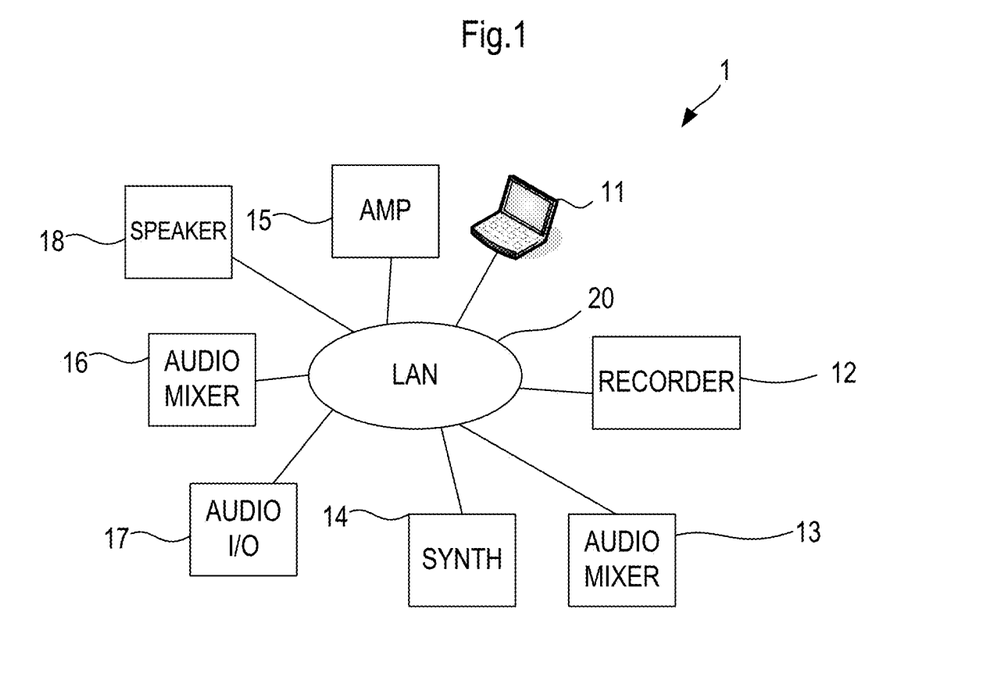
FIG. 1 is a block diagram illustrating a configuration of an audio control system 1.

FIG. 1 is a block diagram illustrating a configuration of an audio control system 1. The audio control system 1 is provided with a PC 11, a recorder 12, an audio mixer (hereinafter referred to as a mixer) 13, a synthesizer 14, an amplifier 15, another mixer 16, an audio I/O unit (hereinafter referred to as an I/O unit) 17, a speaker 18, and a LAN (Local Area Network) 20. The PC 11, the recorder 12, the mixer 13, the synthesizer 14, the amplifier 15, the mixer 16, the I/O unit 17, and the speaker 18 are connected to one another through the network (LAN) 20. The LAN 20 is a network through which a packet, such as a command and a response, is able to be transmitted between devices. The LAN 20 may be a system through which audio signals for a plurality of channels are able to be transmitted in real time, the system being similar to Dante (registered trademark) or CobraNet (registered trademark). In a case where the network has no real-time transmission function, the devices may be connected using an audio cable (not illustrated), for example. In addition, the connection mode of each device is not limited to a network connection through the LAN. For example, each device may be connected by a MIDI (Musical Instrument Digital Interface).

Figure 2:
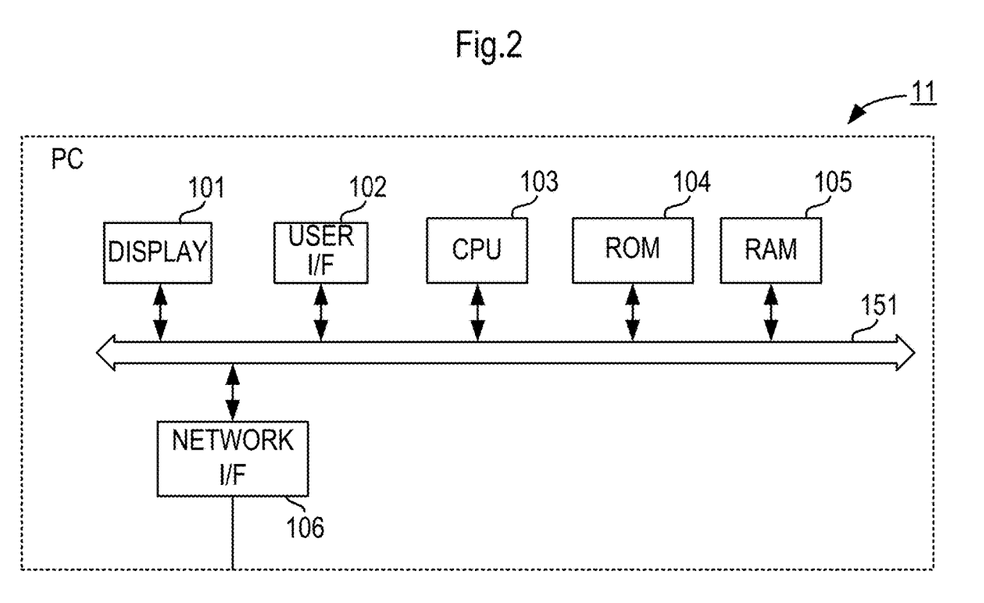
FIG. 2 is a block diagram illustrating a configuration of a PC.

The PC 11 is an example of the control device of the present invention, and may be a general-purpose computer (information processing device) that remotely controls other devices (audio devices, for example) connected through the LAN 20. FIG. 2 is a block diagram illustrating a configuration of the PC 11. The PC 11 is provided with components, such as a display 101, a user interface (I/F) 102, a CPU 103, a ROM 104, a RAM 105, and a network interface (I/F) 106. All of the components can be connected to a bus 151.

The display 101 may include an LCD (Liquid Crystal Display), for example, and displays various types of information. The user I/F 102 includes a mouse or a keyboard, and receives an operation of a user. The user I/F 102, together with the display 101 correspond to a GUI (Graphical User Interface).

The CPU 103 corresponds to the receiving portion (task), the setting portion (task), and the transmitting portion (task). The CPU 103 can read a program stored in the ROM 104 (storage medium) and store in the RAM 105, and execute predetermined tasks/steps. For example, the CPU 103 can execute a receiving task that displays on the display 101 an image of an operation element operable by a user to input a user instruction. The user I/F 102 receives an operation of a user with respect to the image of the operation element. The CPU 103 receives operations, such as selection with respect to the image of the operation element, through the user I/F 102.

Figure 3A:
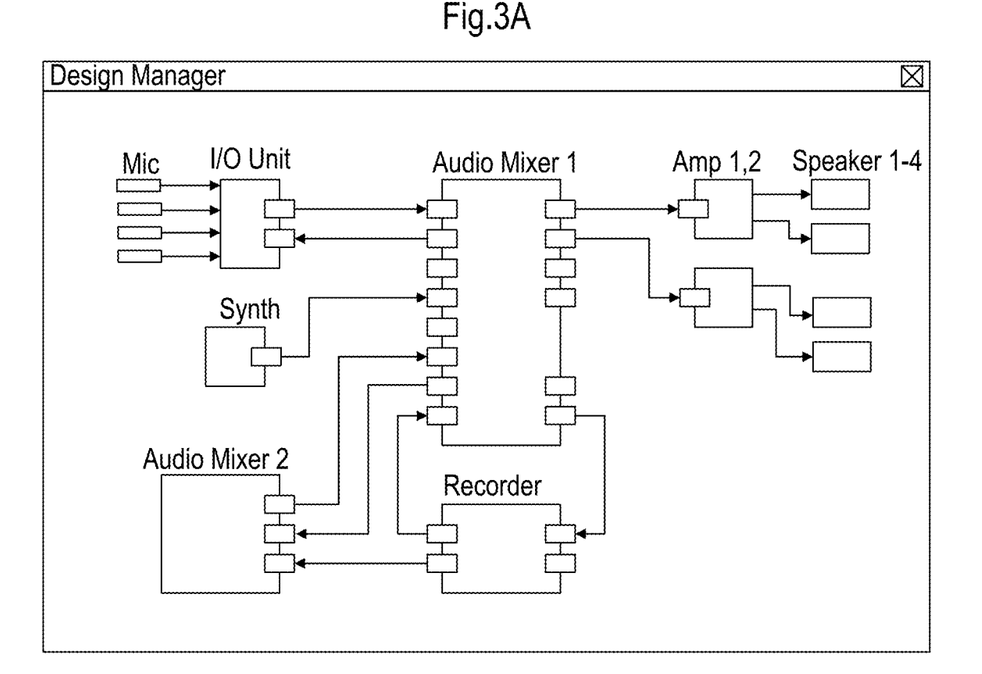
FIG. 3A is an example of a GUI displayed on a display 101.

FIG. 3A is an example of a GUI displayed on the display 101. In the GUI illustrated in this example, a user arranges a block image of each owned device at a desired position on a screen. The user can set the connection mode of the audio signal in the network 20 or can set the setting value of the parameter of each function of each device. The user, on the screen displayed on the display 101, arranges the image of a component corresponding to each device using the user I/F 102, and makes a connection. A small square image illustrated in the block of each device in FIG. 3A corresponds to an audio communication port. In one communication port, audio signals for a plurality of channels are able to be bidirectionally transmitted between other devices.

Figure 3B:
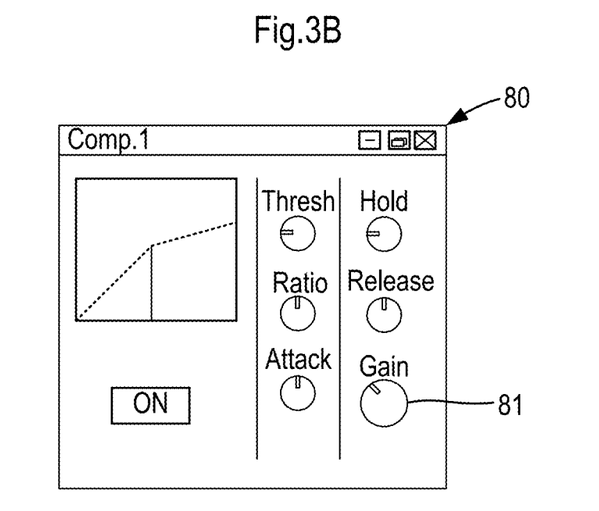
FIG. 3B is a view of an example of a parameter edit screen of Comp. 1.

When a user double-clicks the block image of a certain device illustrated in FIG. 3A, a remote control window of the device is opened. In the remote control window, when the user specifies any of the functions (a selector, an equalizer, a compressor, an attenuator, or the like) with which the device is provided, a control screen (such as the parameter screen 80 of FIG. 3B, the parameter screen 70 of FIG. 6, or the parameter screen 80 of FIG. 6) that displays a plurality of parameters of a specified function is displayed. The user can perform control of the setting value of a parameter on the control screen. In the example of the parameter screen 80 of FIG. 3B, as a parameter of "Comp. 1," a threshold (Thresh), a ratio, an attack, a hold, a release, a gain, and the like are displayed. The user inputs the setting value of each parameter on the parameter screen of each function. In the example of FIG. 3B, the user can input the setting value of each parameter by operating a knob image 81 being displayed corresponding to each parameter.

The user, during the operation of the audio control system 1, on an edit screen illustrated in FIG. 3A and FIG. 3B, inputs the arrangement of each device, a connection mode, and the setting value of a parameter in each function. Each device on the screen is arranged according to the input of the user. In addition, each device on the screen is connected according to the input of the user. Moreover, the connection mode of each device in the network 20 is remotely changed according to the input of the user. Further, the setting value of a parameter in each function of each device is remotely controlled according to the input of the user.

The CPU 103 of the PC 11 transmits various commands to a corresponding device according to the input of the user. Each device, based on a received command, transmits and receives the audio signal in the network 20 or sets the setting value of each parameter of each function.

Figure 4A:
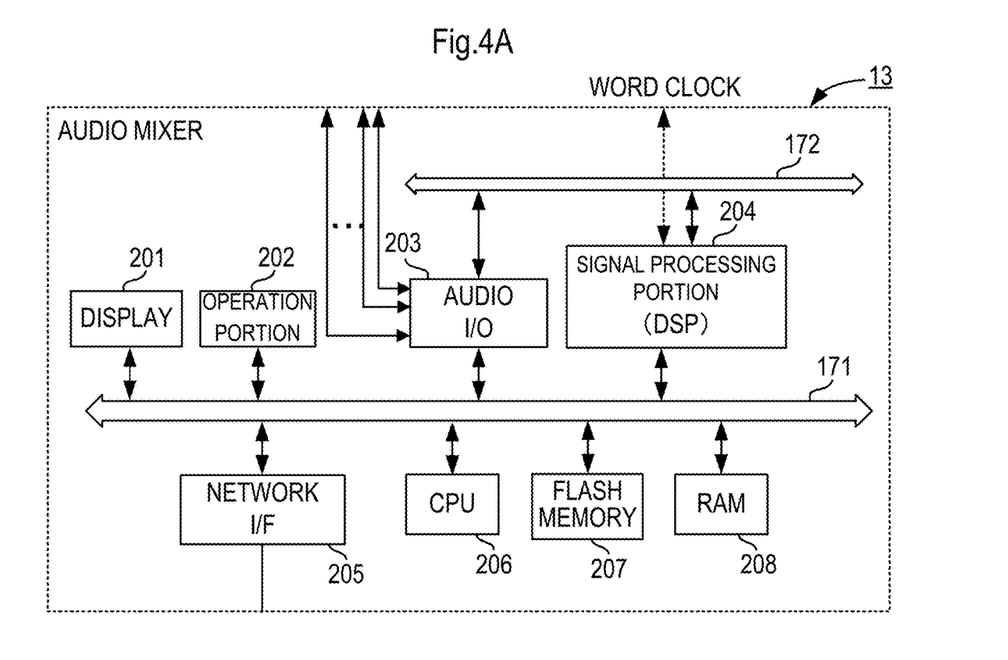
FIG. 4A is a block diagram illustrating a configuration of an audio mixer.

FIG. 4A is a block diagram illustrating a configuration of the mixer 13 as an example of a device that configures the audio control system 1. The mixer 13 is provided with components, such as a display 201, an operation portion 202, an audio I/O 203, a signal processing portion 204, a network I/F 205, a CPU 206, a flash memory 207, and a RAM 208.

All of the components are connected through a bus 171. In addition, the audio I/O 203 and the signal processing portion 204 are also connected to a waveform bus 172 configured to transmit a digital audio signal.

The CPU 206 is a control portion that controls the operation of the mixer 13. The CPU 206 performs various kinds of operations by reading a predetermined program stored in the flash memory 207 (storage medium) and store in the RAM 208, and executes the program. For example, the CPU 206, based on various commands that have been received from the PC 11 through the network I/F 205, performs input and output of an audio signal in the audio I/O 203, mixing processing in the signal processing portion 204, effect processing, a change in setting value of a parameter, and the like.

The signal processing portion 204 is configured by a plurality of DSPs for performing various types of signal processings, such as mixing processing or effect processing. The signal processing portion 204 performs effect processing, such as mixing or equalizing to the audio signal supplied from the I/O unit 17 through the network 20, the audio I/O 203, and the waveform bus 172. The signal processing portion 204 outputs a signal-processed digital audio signal to the I/O unit 17 or the amplifier 15 through the waveform bus 172, the audio I/O 203, and the network 20.

Figure 4B:
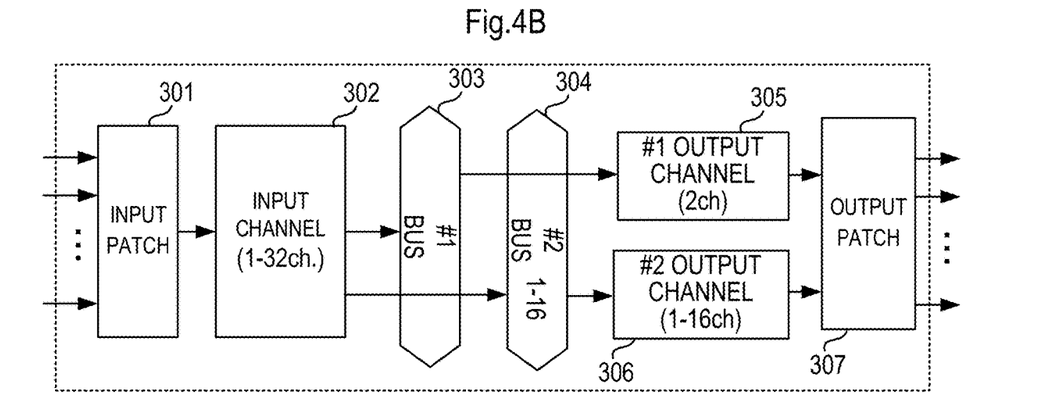
FIG. 4B is an equivalent block diagram of signal processing performed in a signal processing portion, an audio I/O, and a CPU.

FIG. 4B is an equivalent block diagram of signal processing performed in the signal processing portion 204, the audio I/O 203, and the CPU 206. As illustrated in FIG. 4B, the signal processing is functionally performed by an input patch 301, an input channel 302, a first bus (#1 bus) 303, a second bus (#2 bus) 304, a first output channel (#1 output channel) 305, a second output channel (#2 output channel) 306, and an output patch 307.

Figure 5A:
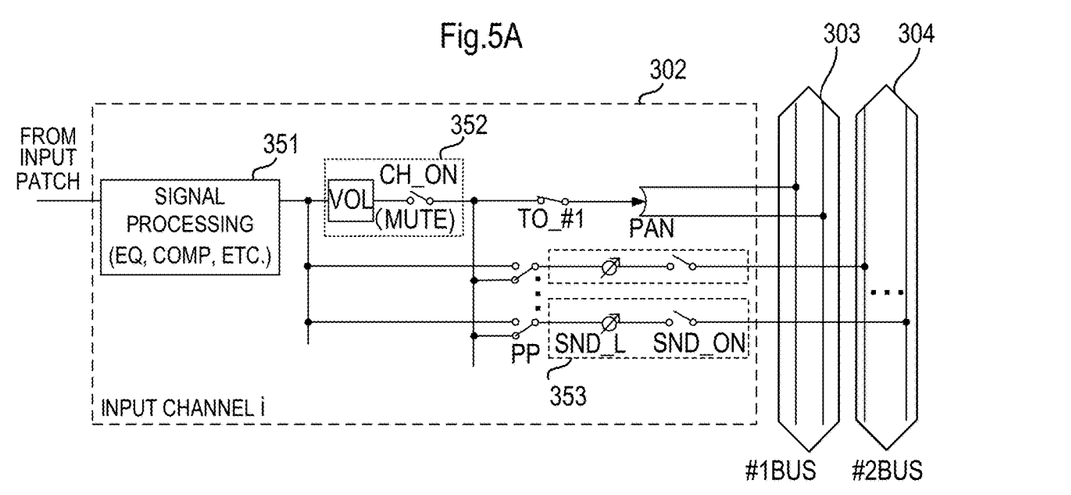
FIG. 5A is a block diagram illustrating a circuit configuration of a certain input channel i.

The input channel 302 has a plurality of channels. An audio signal is supplied from the input patch 301 to each of the channels of the input channel 302. FIG. 5A is a block diagram illustrating a circuit configuration of a certain input channel i. The each channel of the input channel 302, in a signal processing block 351, performs signal processing, such as an equalizer (EQ) or a compressor (COMP), to the audio signal supplied from the input patch 301. In addition, each channel of the input channel 302 sends out the signal-processed audio signal to buses (#1 bus 303 and #2 bus 304) provided in a subsequent stage. The level of an audio signal to be sent out is able to be individually adjusted for each bus. For example, the audio signal to be sent out to the #1 bus 303 is adjusted in level in a level adjustment circuit 352. The level adjustment circuit 352 is provided with a level adjustment circuit (Vol) and a switch circuit (CH_ON). Therefore, the level adjustment circuit 352 is not only able to perform level adjustment but also able to turn on and off (MUTE ON or MUTE OFF) a signal output. In addition, the audio signal to be sent out to the #2 bus 304 is adjusted in level in a level adjustment circuit 353 provided in each channel of the #2 bus 304. The level adjustment circuit 353 is also provided with a level control circuit (SND_L) and a switch circuit (SND_ON). Therefore, the level adjustment circuit 353 is not only able to perform level adjustment but also able to turn on and off the signal output. It is to be noted that the audio signal to be sent out to the #2 bus 304 is also able to avoid the level adjustment circuit 352 in a selector (circuit indicated by PP in FIG. 5A). In addition, for the output to the #1 bus 303, a level balance adjustment circuit (PAN) which adjust a level balance between a first output channel and a second output channel and an output switch (To_#1) is provided.

The #1 bus 303 and the #2 bus 304 each mix audio signals to be input, and output resulting audio signals to the #1 output channel 305 and the #2 output channel 306. Each channel of the #1 output channel 305 and the #2 output channel 306 performs signal processing, such as equalizing or compressing, to the audio signals to be input. Subsequently, signal-processed audio signals are supplied to the audio I/O 203.

The above signal processing is controlled on the basis of the setting value of various parameters. A command to indicate a setting value of a parameter is received from the PC 11, as described above. The mixer 13 operates based on the setting value of the parameter that is remotely controlled by the PC 11.

In addition, in the audio control system 1, while a plurality of devices are in operation, a user operates the PC 11 and can collectively control a plurality of parameters, including the ON or OFF state and the level corresponding to each function in each of the plurality of devices.

Figure 6:
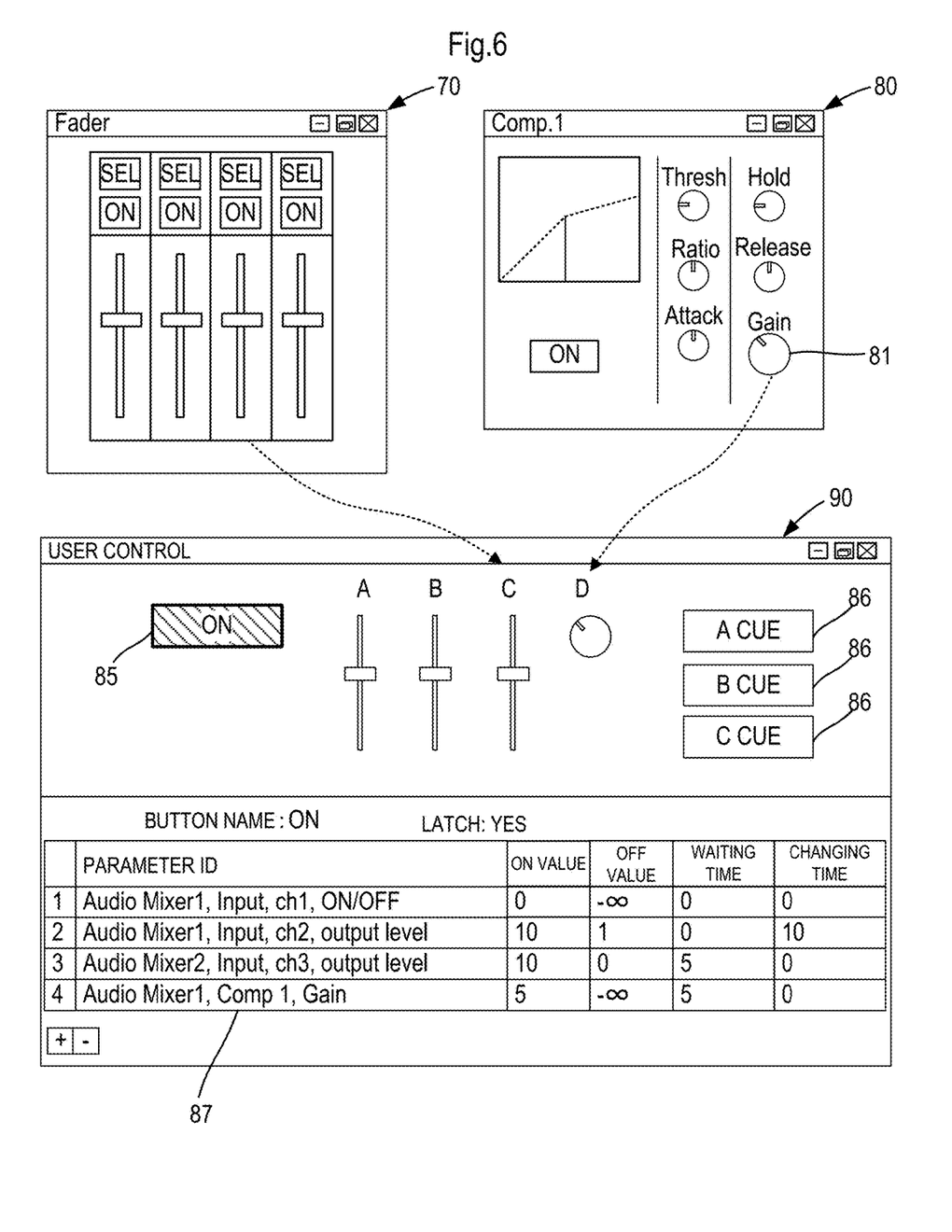
FIG. 6 is an example of a user control screen.

FIG. 6 is an example of a user control screen. On the user control screen 90, a user can arrange, by dragging and dropping the operation element of a desired parameter of a desired function of a desired device (the mixer 13, for example) from the parameter screen 70 or the parameter screen 80, the operation element according to any parameter of any function of any device, in one screen. It is to be noted that, while a mode has been described in which the operation element according to any function and any parameter in the mixer 13 is arranged in one screen, an operation element according to any function and any parameter of another device (the recorder 12, the synthesizer 14, or the amplifier 15, for example) is also can be arranged.

In the example of FIG. 6, the user arranges three faders and the operation element according to the gain of Comp. 1 on the user control screen 90. The three faders may be A: a fader corresponding to the output level of an input channel 1, B: a fader corresponding to the output level of an input channel 2, and C: a fader corresponding to the output level of an input channel 3, respectively.

In addition, an ON button 85 and a CUE button 86 are arranged on the user control screen 90. The ON button (hereinafter also referred to simply as a button) 85 and the CUE button (hereinafter also referred to simply as a button) 86 correspond to the operation element. Moreover, a desired parameter (the ON or OFF state and the level) of a desired function provided in a desired device (the mixer 13, for example) is assigned to the button 85 and the button 86 by the user. Furthermore, an ON value and OFF value of each parameter is set to the button 85 and the button 86.

In the example of FIG. 6, the CUE button 86 includes three CUE buttons 86: an "A CUE" button 86, a "B CUE" button 86, and a "C CUE" button 86, and each CUE button 86 is set to cause an audio signal to be output to a bus (for a monitor, for example) of another channel that is not used for output of the main or the like, with respect to each channel. One of the #2 buses can be secured as a bus for a monitor. For example, when a user operates the "A CUE" button 86, a signal of the channel (the input channel 1, for example) corresponding to the "A CUE" button 86 is supplied to the bus for a monitor. The user can listen to the signal of this bus for a monitor with headphones.

When the user operates the ON button 85, the CPU 103 of the PC 11 transmits, to the mixer 13, a setting instruction (command) for changing the current setting value of each parameter among the plurality of parameters to a setting value (an ON value or an OFF value) associated with the ON button 85.

The property of which any one of the operation elements is arranged on the user control screen 90 is displayed in a property table 87 and above the property table 87. When the ON button 85 is selected, the setting state of the ON button 85 is displayed in the property table 87 and above the property table 87. In FIG. 6, the button name is set as "ON" by the user and the button 85 is called the ON button. In addition, a latch is set to "YES" and the ON button 85 performs a toggle operation in which the ON state and the OFF state may be switched every time the user presses the ON button 85. Moreover, four parameters are assigned to the ON button 85 by the user. Furthermore, an ON value and an OFF value are set to each of the four parameters.

In a case where the ON button 85 is currently OFF and a user presses the ON button 85, the CPU 103 of the PC 11 transmits a command to change the current setting value to an ON value with respect to a plurality of parameters assigned to the ON button 85, to a device (the mixer 13, for example) corresponding to each parameter. The mixer 13 changes the current setting value of a corresponding parameter to an ON value according to a received command. In a case where the ON button 85 is currently ON and a user presses the ON button 85, the CPU 103 of the PC 11 transmits a command to change the current setting value to an OFF value with respect to a plurality of parameters assigned to the ON button 85, to a device corresponding to each parameter. A corresponding device (the mixer 13, for example) changes the current setting value of a corresponding parameter to an OFF value according to a received command.

Therefore, the user can collectively set an ON or OFF state and a level by pressing the ON button 85 with respect to a plurality of functions of a plurality of devices (the mixer 13 and the mixer 16, for example).

More specifically, in the example of FIG. 6, as illustrated in the property table 87, four parameters are assigned to the ON button 85. In the uppermost horizontal row of the property table 87, the parameter of an ON or OFF state with respect to a channel 1 (ch1) of the input (Input) in the mixer 13 (Audio Mixer 1) is assigned. In the second horizontal row of the property table 87, an output level as a parameter with respect to a channel 2 (ch2) of the input (Input) in the mixer 13 (Audio Mixer 1) is assigned. In the third horizontal row of the property table 87, an output level as a parameter with respect to a channel 3 (ch3) of the input (Input) in the mixer 16 (Audio Mixer 2) is assigned. Further, in the lowermost horizontal row of the property table 87, a gain as a parameter with respect to a compressor (Comp. 1) in the mixer 13 (Audio Mixer 1) is assigned.

In other words, in this example, the user, in the property table 87, can assign a desired parameter of a desired device to the button 85 and the button 86. For example, the CPU 103 of the PC 11, by obtaining a list of a plurality of parameters of a plurality of functions from each of a plurality of devices and presenting information on the list to a user, is able to let the user to select a parameter that the user desires to assign, from the list.

Furthermore, the user, for each assigned parameter, may set a setting value (an ON value) when a button is turned on, a setting value (an OFF value) when the button is turned off, waiting time, and changing time.

Figure 5B:
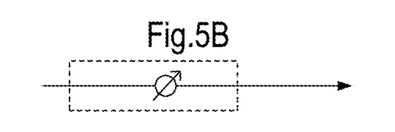
FIG. 5B is a block diagram illustrating a function portion provided with a level control circuit.
Figure 5C:
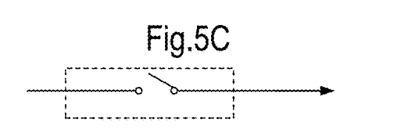
FIG. 5C is a block diagram illustrating a function portion provided with a switch circuit.

In addition, in a case where the assigned parameter is a parameter of an ON or OFF state of a switch as illustrated in FIG. 5C, the value of zero, for example, corresponds to the OFF state in which an audio signal is blocked, and the value of 1 corresponds to the ON state in which an audio signal is passed through. In a case where both the switch and the level controller that are illustrated in FIG. 5D are provided, the passage or blockage of an audio signal may be achieved by any parameter of either the switch and the level controller.

Figure 5D:
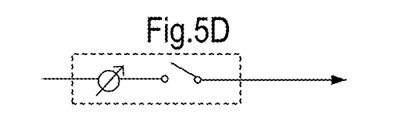
FIG. 5D is a block diagram illustrating a function portion provided with the level control circuit and the switch circuit.

In addition, in a case where the assigned parameter is a level parameter of the level controller as illustrated in FIG. 5B and FIG. 5D, and the user desires to change the state to the OFF state, the parameter may be set to a value of $-\infty$ dB (equivalent to zero). The user, when desiring to change the state to the ON state, sets the value of 0 dB (equivalent to 1). However, the user does not necessarily have to set the value to 0 dB (equivalent to 1). The user may set a desired value and may simultaneously control the level of an audio signal. For example, with respect to the parameter of the second horizontal row and the third horizontal row illustrated in FIG. 6, the ON value as a value that changes the state of an audio signal to the ON state is set to 10 dB.

Subsequently, a description is made of waiting time of each parameter in the property table 87. The CPU 103 of the PC 11 may change a transmission timing of a command for remote control according to the waiting time set to the parameter. Accordingly, the CPU 103, after waiting until the waiting time passes after the button 85 or the button 86 is pressed, may change the value of each parameter of each device to the ON value or the OFF value. Alternatively, the CPU 103 may include information on the waiting time in the command for remote control. Accordingly, each device, after waiting until the waiting time passes after the button 85 or the button 86 is pressed, may change the value of each parameter of each device to the ON value or the OFF value. For example, in FIG. 6, since the waiting time is set to 5 in the third horizontal row, the output level of the channel 3 (ch3) of the input (Input) in the mixer 16 (Audio Mixer 2) is turned on or off 5 seconds after the button 85 is pressed. Similarly, since the waiting time is also set to 5 in the fourth horizontal row, the gain of the compressor (Comp) 1 is changed to the ON value or the OFF value 5 seconds after the button 85 is pressed.

Accordingly, a user, only by pressing the button 85 or the button 86, can mutually shift (provide a time difference) a timing when a plurality of functions are turned on or off. Therefore, in a case where a first function and a second function that are connected in series are provided, for example, after the first function is turned off and the input of an audio signal is completed, the second function is able to be turned off. In addition, in a case where the input from a device that outputs a high level signal is turned on, for example, the output to a certain device (an amplifier or a speaker, for example) is first turned off, and then an excessive level signal is able to be prevented from being input to an amplifier, a speaker, or the like on an output side mainly by turning on the input of a high level signal. However, the setting of waiting time is not an essential configuration in the present invention.

Subsequently, a description is made of changing time of each parameter. The CPU 103 of the PC 11, based on the changing time of each parameter, may control time required from when the setting value of the parameter starts changing to when the setting value is changed to the ON value or the OFF value. The CPU 103, with respect to a device provided with an interpolation function (a function to change the setting value of a parameter gradually by a predetermined interpolated value when the setting value changes from a first value to a second value) of a parameter, may transmit one command to direct the device to change the setting value over changing time from the ON value to the OFF value by a predetermined interpolated value. The CPU 103, with respect to a device provided without the interpolation function, first obtains the current setting value of a parameter from the device, and transmits a command that has a different setting value, to the device every predetermined time, for example, every several tens of milliseconds, so that an obtained current setting value may gradually approach the ON value or the OFF value. For example, in FIG. 6, since the changing time is set to 10 in the second horizontal row, the output level of the channel 2 (ch2) of the input (Input) in the mixer 13 (Audio Mixer 1) is changed to the ON value or the OFF value over 10 seconds after the button 85 or the button 86 is pressed.

Accordingly, a user, only by pressing the button 85 or the button 86, can gradually change a plurality of parameters from the current setting value to the ON value or an OFF value over the changing time. For example, the user, by only pressing the button 85 or the button 86, can cross-fade audio signals of a plurality of channels or can cross-fade effect processing of an audio signal between two effects. However, the setting of changing time is also not an essential configuration in the present invention.

Furthermore, the setting, such as "BUTTON NAME: ON" and "LATCH: YES", is displayed above the property table 87. The button name is a name of the button that is currently selected. The CPU 103 of the PC 11 controls the display device 101 display the name that a user has set on the button. The latch may be the setting of the latch operation of the button. In the example, the user has set "YES." In such a case, the CPU 103 of the PC 11 alternately switches the ON state and OFF state of the button every time the user presses the button. In a case where the latch is set to "NO" (unlatch), only while the user presses the button 85, the button may be set to the ON state (each ON value is valid), and, when the button is released, the button may be returned to the OFF state (each OFF value is valid).

Figure 7:
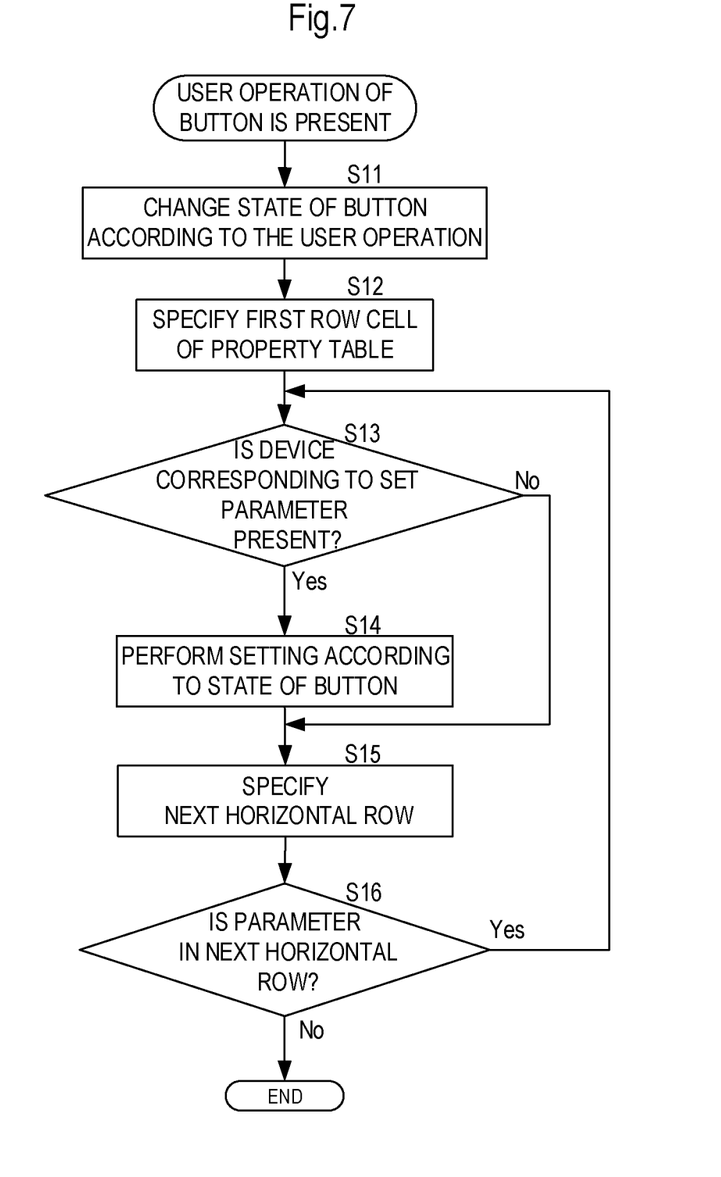
FIG. 7 is a flowchart illustrating an operation when a user operates an ON button 85.

FIG. 7 is a flowchart of an operation of the control device (PC 11). When a user operates the button 85 or the button 86, the operation of the flow chart illustrated in FIG. 7 starts. First, the CPU 103 of the PC 11 changes the state of the button according to the operation of the user (S11). For example, in a case where "LATCH: YES" is set and a user operates the button, when the current state is OFF, the state is turned ON, and, when the current state is ON, the state is turned OFF. At this time, the CPU 103 may indicate the ON state and OFF state of the button by lighting or non-lighting of the button. Alternatively, the CPU 103 may display a character or the like indicating "ON" and "OFF" on the button 85 or the button 86.

Then, the CPU 103 specifies the uppermost horizontal row (first row cell) of the property table 87 (S12). The CPU 103 determines whether or not a device corresponding to the parameter set in the uppermost horizontal row is present (S13). The CPU 103, when a corresponding device is present (S13: Yes), sets by remote control the value of a parameter corresponding to the device corresponding to the uppermost horizontal row to an ON value or an OFF value according to the current state of the button (S14). The CPU 103 subsequently specifies the next horizontal row (second row cell, for example) (S15).

In other words, the CPU 103 of the PC 11 transmits, with respect to the corresponding device (mixer 13, for example), a command that sets the ON value or the OFF value according to the state of the button, among the setting values of the parameters of the device. The transmission timing of the command, the details of the command to be transmitted, and the like can be controlled on the basis of the "waiting time" and the "changing time" that have been set. In a case where the CPU 103, in step S13, determines that no corresponding device is present (S13: No), the CPU 103 specifies the next horizontal row (second row cell, for example) (S15). Then, the CPU 103 repeats processing from step S13 when a parameter in the next horizontal row is present (S16: Yes), and ends the processing when a parameter in the next horizontal row is not present (S16: No).

Figure 8:
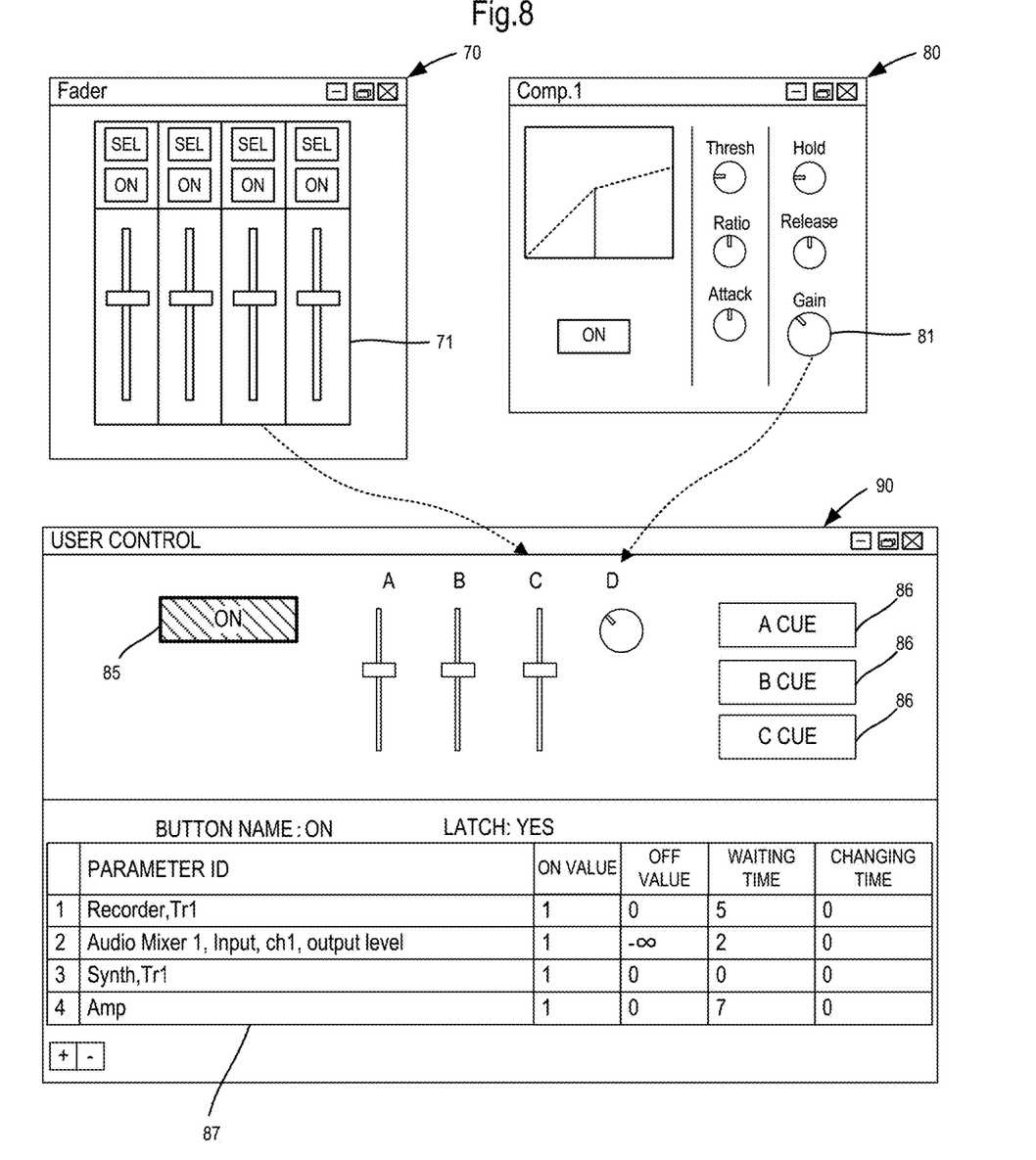
FIG. 8 is an example of the user control screen.

In the above example, in one aspect, the CPU 103 of the PC 11 transmits, with respect to a plurality of mixers (the mixer 13 and the mixer 16), the ON value or the OFF value among the setting values of the parameters of each function. However, the CPU 103 is also able to transmit the ON value or the OFF value to other plurality of devices. For example, as illustrated in FIG. 8, the user can also assign four devices of the recorder 12, the audio mixer 13, the synthesizer 14, and the amplifier 15 to the button 85. In such a case, the user, by only pressing the button 85, can control the ON or OFF state and the level with respect to any function of the four devices of the recorder 12, the audio mixer 13, the synthesizer 14, and the amplifier 15.

Figure 9:
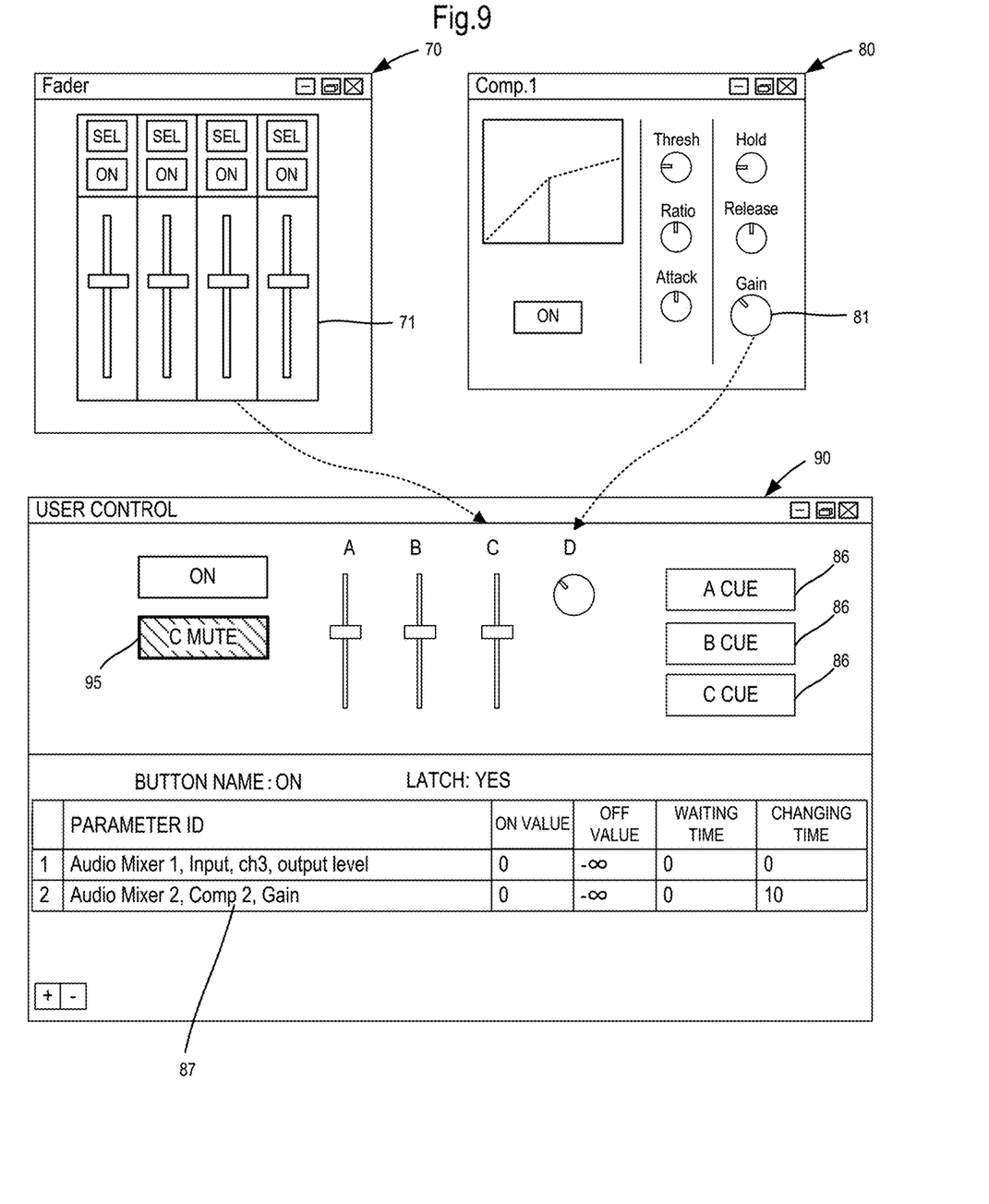
FIG. 9 is another example of the user control screen.

It is to be noted that the operation element is not limited to the "ON" button 85 or the "CUE" button 86, and may be a "Mute" button 95 of FIG. 9. For example, the output level of the parameter of the fader of the input channel 3 of the mixer 13 (Audio Mixer 1) and the output gain of the compressor (COMP) 2 of the mixer 16 (Audio Mixer 2) are assigned to the mute button 95. A user, in the property table 87, inputs the two parameters and the ON value and the OFF value of each parameter. For example, the user sets the OFF value of the output level of the fader parameter of the input channel 3, and the OFF value of the output gain of the compressor (COMP) 2 of the mixer 16 (Audio Mixer 2) to −∞ dB, respectively. Accordingly, the user, by pressing the button 95, can mute the input channel 3 of the mixer 13, and the compressor (COMP) 2 of the mixer 16.

Figure 10:
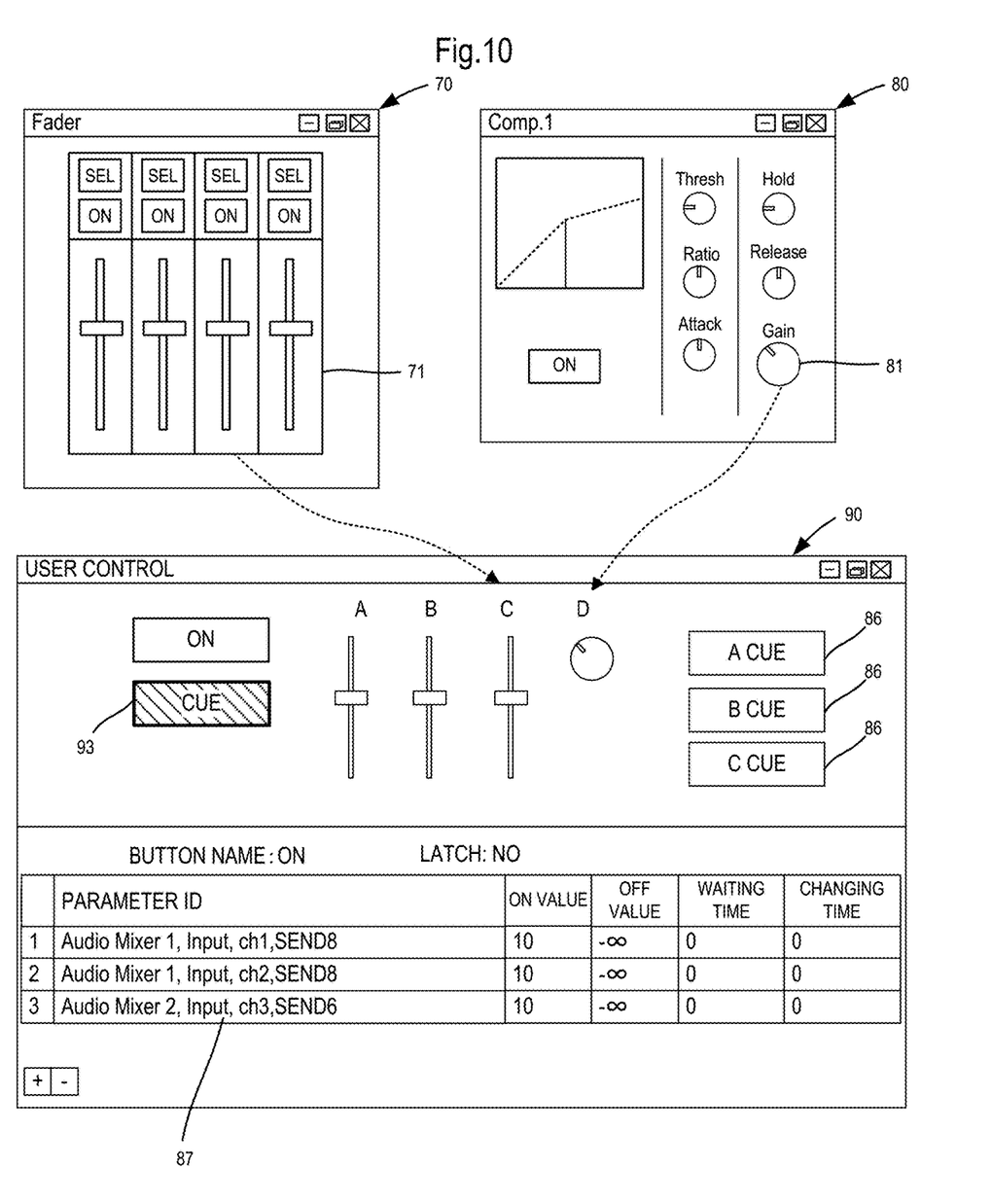
FIG. 10 is another example of the user control screen.

FIG. 10 illustrates an example in which, by one button 93, a plurality of audio signals of a plurality of mixers are collectively set to "CUE," and are input to a bus for a monitor. For example, a user performs setting to cascade-connect the bus of the mixer 13 and the bus of the mixer 16 that are previously secured for a monitor. Subsequently, the user assigns a send level from desired plurality of channels of the mixer 13 and the mixer 16 to a cascade-connected bus, to the CUE button 93. In addition, the user sets the ON value and OFF value of the send level. In a case of the CUE, the latch may be set to "NO." The user, by pressing the CUE button 93, only while pressing, can collectively input audio signals of desired plurality of channels to the bus for a monitor and confirm the input. Then, when the user stops pressing the button, the audio signals of the plurality of channels are blocked from being supplied to the bus for a monitor.

Figure 11:
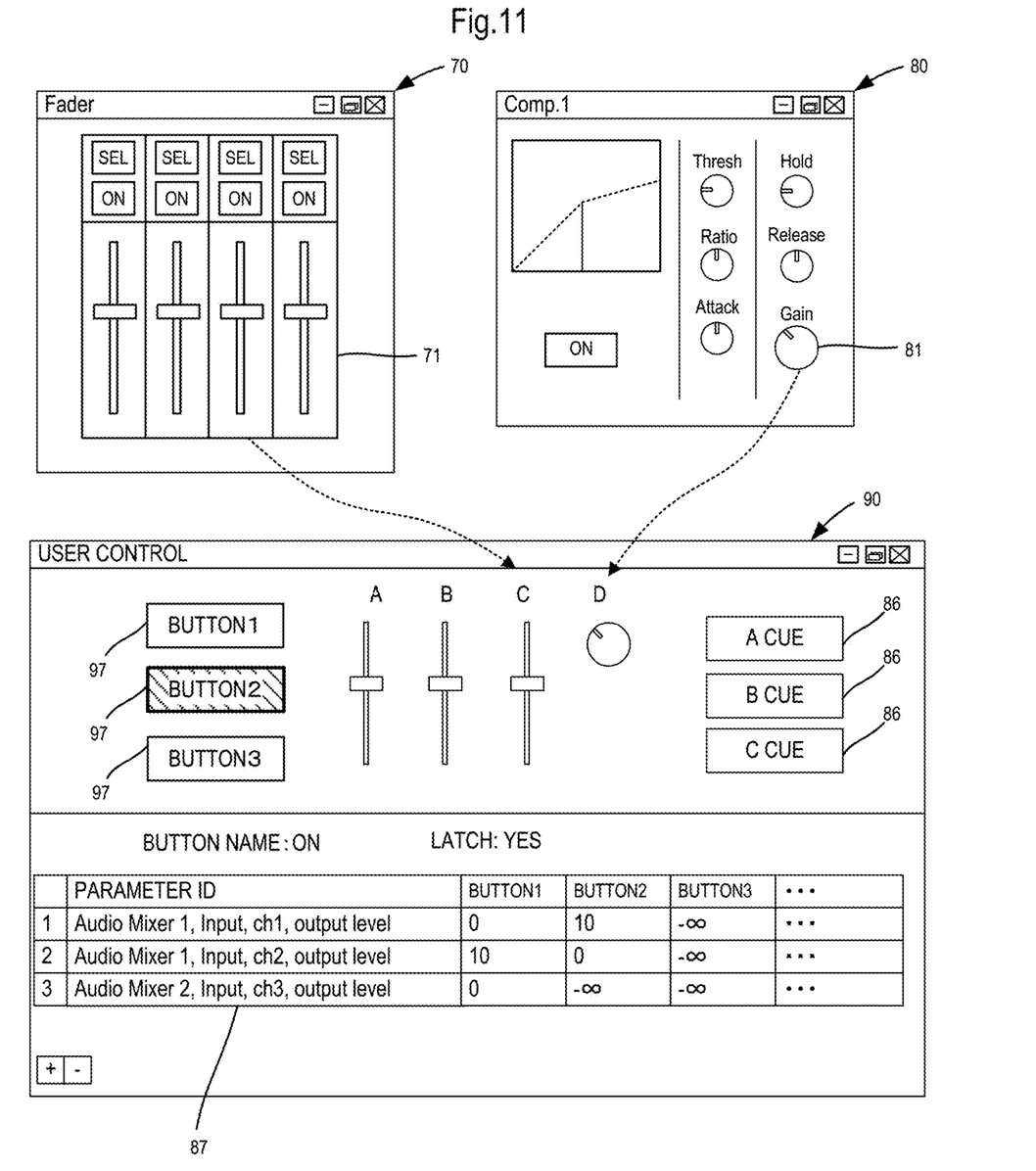
FIG. 11 is another example of the user control screen.

FIG. 11 illustrates an example of a case where what is called a radio button is used as an operation element, and, among a group of buttons, any one button is always in the ON state and all the remaining buttons are in the OFF state. In this example, three radio buttons 97 are arranged on the user control screen. In the property table 87, a value with respect to a "BUTTON 1," a value with respect to a "BUTTON 2," and a value with respect to a "BUTTON 3" are input, respectively. For example, as the value with respect to the "BUTTON 1," 0 dB as the output level of the channel 1 of the audio mixer 13 (Audio Mixer 1), 10 dB as the output level of the channel 2 of the audio mixer 13 (Audio Mixer 1), and 0 dB as the output level of the channel 3 of the audio mixer 16 (Audio Mixer 2) are input. For example, as the value with respect to the "BUTTON 2," 10 dB as the output level of the channel 1 of the audio mixer 13 (Audio Mixer 1), 0 dB as the output level of the channel 2 of the audio mixer 13 (Audio Mixer 1), and −∞ dB as the output level of the channel 3 of the audio mixer 16 (Audio Mixer 2) are input. As the value with respect to the "BUTTON 3,"−∞ dB as the output level of all the channels of all the audio mixers is input.

In such a case, a user, when pressing the "BUTTON 1," can raise the level of the channel 2 of the audio mixer 13 (Audio Mixer 1) by 10 dB, and set the level of other channels to 0 dB. The user, when pressing the "BUTTON 2," can raise the level of the channel 1 of the audio mixer 13 (Audio Mixer 1) by 10 dB and mute the channel 3 of the audio mixer 16 (Audio Mixer 2). The user, when pressing the "BUTTON 3," can mute all the channels of all the mixers.

As described above, the control device can collectively control a plurality of parameters with respect to any function of any device, according to one operation of a user.

Finally, the foregoing embodiments are illustrative in all points and should not be construed to limit the present invention. The scope of the present invention is defined not by the foregoing embodiments but by the following claims. Further, the scope of the present invention is intended to include all modifications within the scopes of the claims and within the meanings and scopes of equivalents. For example, a mixer may be a type capable of changing the configuration of the function of signal processing or may be a type capable of fixing all or a part of the configuration of the function of signal processing. In addition, a musical instrument, such as an automatic performance piano, is also an example of an "audio device." The musical instrument, such as an automatic performance piano, is included in an example of a "device assigned to an operation element." A user can remotely control the setting value of a parameter including an ON or OFF state and a level with respect to the musical instrument, such as an automatic performance piano. In addition, the parameter may include a tempo or a pitch, for example, besides the ON or OFF state and the level.

What is claimed is:

1. A control device comprising:
   a control circuit configured as:
      a receiving portion configured to display an image of an operation element and receive an operation of a user with respect to the operation element;
      a setting portion configured to receive:
         a device assigned to the operation element;
         a parameter including an ON or OFF state and a level of the device assigned to the operation element; and
         a setting value of the parameter corresponding to an operation state of the operation element; and
      a transmitting portion configured to transmit a setting command to the device assigned to the operation element in a case in which the operation element is operated to be into a predetermined operation state, which includes a first operation state and a second operation state, the setting command being configured to change a setting value of the parameter from a current value to a setting value associated to the operation element,
      wherein the setting portion receives:
         a latch setting in which the first operation state and the second operation state are alternately switched every time the operation element is operated; and
         an unlatch setting in which the operation element in the second operation state only while the operation element is being operated and the operation element is in the first operation state when the operation element is not operated, and
      wherein the transmitting portion transmits the setting command in a case where the operation element is in the first operation state or the second operation state.

2. The control device according to claim 1, wherein:
   the setting portion further receives a setting of waiting time, and
   the setting command includes information for changing the setting value of the parameter from the current value to the setting value associated to the operation element after the waiting time passes.

3. The control device according to claim 1, wherein:
   the receiving portion further receives a setting of changing time, and
   the setting command includes information for changing the setting value of the parameter from the current value to the setting value associated to the operation element over the changing time.

4. The control device according to claim 1, wherein the device assigned to the operating element includes an audio device.

5. The control device according to claim 1, wherein the transmitting portion transmits the setting command to the device that is connected through a network.

6. A control device comprising:
   a memory storing instructions; and
   a processor configured to implement the instructions stored in the memory and execute:
      a receiving task that displays, in a graphical user interface, an image of an operation element that is operable by a user to input a user input;
      a setting task that receives:
         a device assigned to the operation element;
         a parameter, including an ON or OFF state or a level of the device assigned to the operation element; and
         a setting value of the parameter corresponding to an operation state of the operation element; and
      a transmitting task that transmits a setting command to the device assigned to the operation element in a case where the operation element is operated to be in a predetermined operation state, which includes a first operation state and a second operation state, the setting command changing the setting value of the parameter from a current value to a setting value associated to the operation element,
      wherein the setting task receives:
         a latch setting in which the first operation state and the second operation state are alternately switched every time the operation element is operated; and
         an unlatch setting in which the operation element in the second operation state only while the operation element is being operated and the operation element is in the first operation state when the operation element is not operated, and
      wherein the transmitting task transmits the setting command in a case where the operation element is in the first operation state or the second operation state.

7. The control device according to claim 6, wherein:
   the setting task further receives a setting of waiting time[[;]], and
   the setting command includes information for changing the setting value of the parameter from the current value to the setting value associated to the operation element after the waiting time passes.

8. The control device according to claim 6, wherein:
   the receiving task further receives a setting of changing time; and
   the setting command includes information for changing the setting value of the parameter from the current value to the setting value associated to the operation element over the changing time.

9. The control device according to claim 6, wherein the device assigned to the operating element includes an audio device.

10. The control device according to claim 6, wherein the transmitting task transmits the setting command to the device that is connected through a network.

11. The control method comprising:
- a displaying step of displaying, via a graphical user interface, an image of an operation element that is operable by a user to input a user instruction;
- a device receiving step of receiving a device assigned to the operation element;
- a parameter receiving step of receiving a parameter, including an ON or OFF state or a level of the device assigned to the operation element;
- a setting receiving step of receiving a setting value of the parameter corresponded to an operation state of the operation element;
- a transmitting step of transmitting a setting command to the device assigned to the operation element in a case where the operation element is operated to be in a predetermined operation state, which includes a first operation state and a second operation state, the setting command changing the setting value of the parameter from a current value to a setting value associated to the operation element; and
- a latch receiving step of receiving:
   - a latch setting in which the first operation state and the second operation state are alternately switched every time the operation element is operated; and
   - an unlatch setting in which the operation element in the second operation state only while the operation element is being operated and the operation element is in the first operation state when the operation element is not operated,
   - wherein the transmitting step transmits the setting command in a case where the operation element is in the first operation state or the second operation state.

12. The control method according to claim 11, further comprising:
- a waiting time receiving step of receiving a setting of waiting time,
- wherein the setting command includes information for changing the setting value of the parameter from the current value to the setting value associated to the operation element after the waiting time passes.

13. The control method according to claim 11, further comprising:
- a changing time receiving step of receiving a setting of changing time,
- wherein the setting command includes information for changing the setting value of the parameter from the current value to the setting value associated to the operation element over the changing time.

14. The control method according to claim 11, wherein the device assigned to the operating element includes an audio device.

15. The control method according to claim 11, wherein the transmitting step transmits the setting command to the device that is connected through a network.

16. A non-transitory storage medium storing a program executable by a computer to execute a method comprising:
- a displaying step of displaying, via a graphical user interface, an image of an operation element that is operable by a user to input a user instruction;
- a device receiving step of receiving a device assigned to the operation element;
- a parameter receiving step of receiving a parameter, including an ON or OFF state or a level of the device assigned to the operation element;
- a setting receiving step of receiving a setting value of the parameter corresponded to an operation state of the operation element; and
- a transmitting step of transmitting a setting command to the device assigned to the operation element in a case where the operation element is operated to be in a predetermined operation state, which includes a first operating state and a second operation, the setting command changing the setting value of the parameter from a current value to a setting value associated to the operation element; and
- a latch reciebing step of receiving:
   - a latch setting in which the first operation state and the second operation state are alternately switched every time the operation element is operated; and
   - an unlatch setting in which the operation element in the second operation state only while the operation element is being operated and the operation element is in the first operation state when the operation element is not operated,
- wherein the transmitting step transmits the setting command in a case where the operation element is in the first operation state or the second operation state.

* * * * *